Oct. 19, 1954
W. C. MOELLER
2,691,799
INJECTION MOLDING MACHINE
Filed Feb. 19, 1951
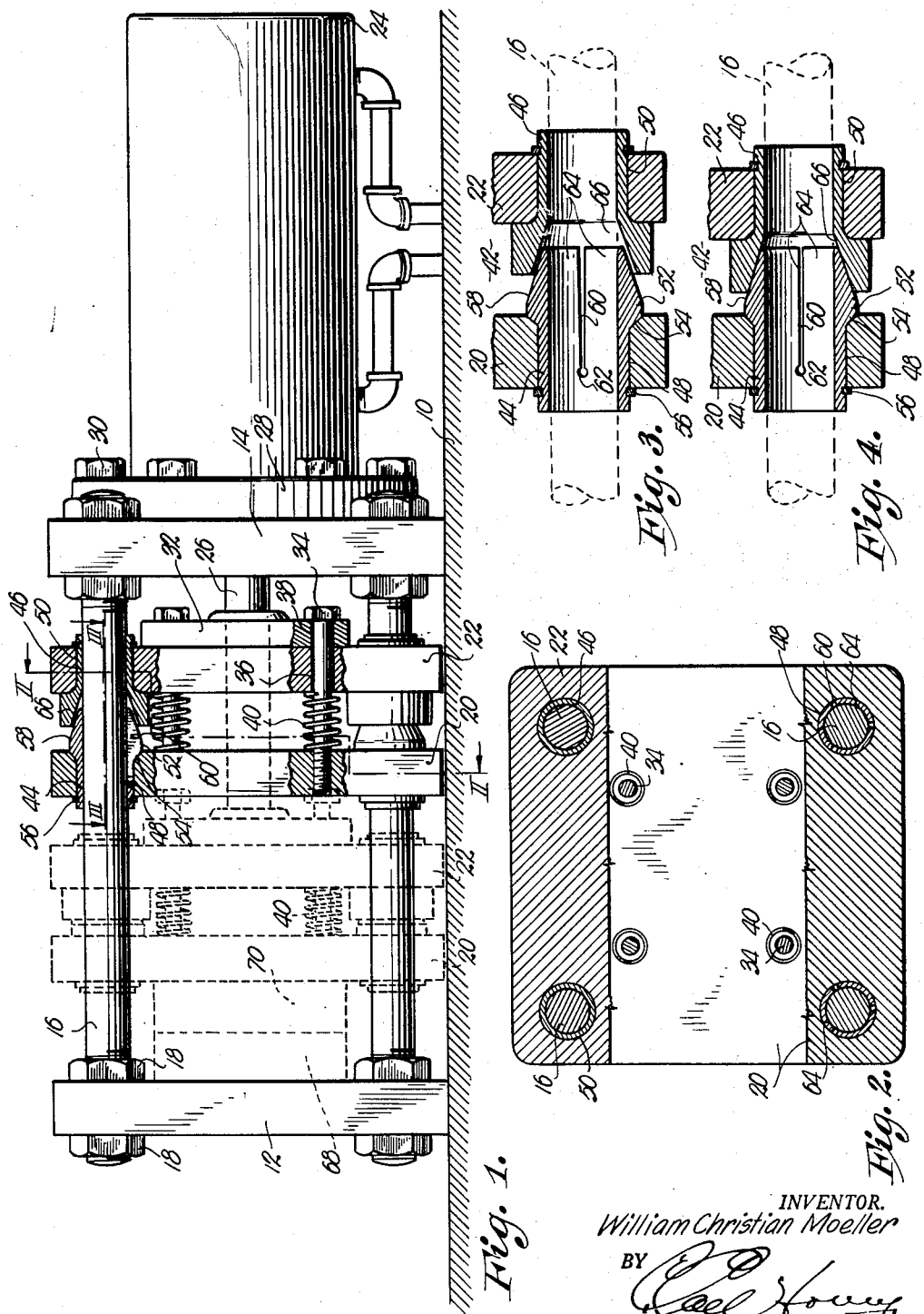
INVENTOR.
William Christian Moeller
BY
ATTORNEY.

Patented Oct. 19, 1954

2,691,799

UNITED STATES PATENT OFFICE 2,691,799

INJECTION MOLDING MACHINE

William Christian Moeller, Kansas City, Mo., assignor to Parmelee Plastics Company, Kansas City, Mo., a corporation of Missouri Application February 19, 1951, Serial No. 211,777

7 Claims. (Cl. 18—30)

This invention relates to a device particularly adapted for use in injection molding and including shiftable parts, together with apparatus forming a part thereof capable of automatically holding certain of the parts in a predetermined position by application of progressively increased pressure as force is applied thereto.

As is well known, injection molding machines are conventionally provided with a pair of relatively movable supports or platens for the parts of the mold and including reciprocable structure for moving one of the supports toward the other support whereby to maintain the mold parts in a predetermined position preparatory to injection of material from which the article being manufactured is produced.

In one form of such conventional machine there is provided over-center linkage or toggle joints for preventing the movable mold support from shifting away from its associated stationary mold support while the article being manufactured is formed between the molds. Such linkage is undesirable in many respects including a high degree of wear that soon renders the same inefficient, presenting loose interfitting of the linkage parts and rendering the same incapable of holding the mold sections in the desired position while the article of the manufacture is being formed therebetween. While adjustment is provided to compensate for the wear to some extent, accurate positioning of the parts is difficult and time-consuming.

A still greater disadvantage of such mechanisms lies in the necessity of resetting each time a new set of molds or dies is mounted thereon requiring considerable time and labor. Additionally, the linkage must be relatively heavy and formed with tolerances that render the expense thereof relatively high.

It is the most important object of the present invention therefore, to improve upon molding machines of the aforementioned character and having as a part thereof, a pair of reciprocable, spaced-apart plates, one of which is adapted to support a part of the mold, there being mechanism carried by the two plates for automatically gripping guide rods therefor upon continued pressure upon the plates while the article of manufacture is formed between the die sections.

It is an important object of the present invention to provide an injection molding machine that includes a pair of supports for the mold sections, one of the supports being shiftable toward and away from the other support and being provided with an auxiliary plate, the plate and the shiftable support having means in the nature of a chuck for automatically clamping the same to elongated guides and holding the supports against separation while material is injected with force between the mold section.

Other objects of the present invention include the way in which a plurality of plates are provided, two of which are rigid and another pair mounted for reciprocation on elongated rods joining the rigid supports; the way in which the reciprocable plates are yieldably held in spaced-apart relationship by interposed springs; the manner of providing a chuck or collet for each guide rod respectively, the manner of causing the chuck to grip its respective rod upon moving of the reciprocable plates together relative to each other; and many other more minor objects, all of which will be made clear as the following specification progresses, reference being had to the accompanying drawing, wherein:

Figure 1 is a side elevation view of an injection molding machine made pursuant to my present invention.

Fig. 2 is a transverse, cross-sectional view taken on irregular line II—II of Fig. 1 looking in the direction of the arrows.

Fig. 3 is an enlarged, detailed, cross-sectional view taken on line III—III of Fig. 1 showing one of the collets or chucks in an inoperative position; and Fig. 4 is an enlarged, detailed, cross-sectional view similar to Fig. 3 but showing one of the expansible collet assemblies operably gripping its guide rod.

The structure about to be described provides means to hold a pair of members together while material is forced therebetween even though such force, together with possible expansion of the material during setting, tends to separate the members. The use that is chosen for the machine, whether for injection molding, die casting or other application, is immaterial. Nor does the nature of the injected material, the manner of injection, or the steps necessary to effect setting or hardening of the material have any bearing on the concepts hereof.

The entire molding machine of the present invention illustrated in the accompanying drawing, may be suitably mounted in any desired manner upon a common base broadly designated by the numeral 10. There is provided a pair of spaced-apart, preferably polygonal, upstanding plate members 12 and 14 rigidly secured to the base 10 and interconnected by a plurality of elongated, parallel guide rods 16.

There is provided a pair of nuts 18 on each end respectively of each of the rods 16 for receiving the corresponding plate 12 or 14 therebetween and thereby facilitating adjustment of the distance between the plates 12 and 14 and maintenance thereof in parallelism.

In the modification chosen for illustration, there is provided four rods 16, as illustrated in Fig. 2 of the drawing, and such rods 16 are adapted to receive a pair of spaced-apart plates 20 and 22 for reciprocable movement together as a unit along the longitudinal axes of the rods 16 between plates 12 and 14. Reciprocable movement may be imparted to the plates 20 and 22 through the medium of actuating power means in the nature of a hydraulic assembly of conventional character and including a cylinder 24 having a reciprocable piston therein (not shown) that is in turn connected with a stem 26 that passes through a clearance opening (not shown) centrally disposed and formed centrally in the vertical support plate 14. The cylinder 24 may conveniently be mounted on the outermost face of the plate 14 through the medium of a flange 28 on cylinder 24 and fastening bolts or screws 30.

Stem 26 is provided on the outermost end thereof between plates 14 and 22 with a head 32 that is in turn connected with the plates 20 and 22 through the medium of a plurality of bolts 34. Bolts 34 are each loosely received by aligned openings 36 and 38 in plate 22 and in head 32 respectively and have one end thereof threaded for securement to the plate 20 in the manner indicated by Fig. 1 of the drawing. Each bolt 34 is also in turn provided with a spring 40 that is coiled thereabout between the plates 20 and 22. The power means has parts, including stem 26 and the piston of cylinder 24 that are thus shiftable relative to plate 20 and connected thereto through the medium of head 32, plate 22, bolts 34 and springs 40.

Collet or chuck structure broadly designated by the numeral 42 is provided for each guide rod 16 respectively and each include a pair of tubular parts 44 and 46 carried by plates 20 and 22 respectively. The normal inside diameters of the tubular parts 44 and 46 are both greater than the diameter of the rods 16 which they circumscribe and openings 48 and 50 are provided in plates 20 and 22 respectively for receiving their corresponding collet sections 44 and 46.

An annular, out-turned flange 52 on the tubular collet portion 44 is complementary with and fitted within an annular, beveled seat 54 circumscribing the opening 48 and thereby limiting the movement of tube 44 with respect to plate 20 toward the plate 12. Through the medium of a groove and split-ring structure 56, tube 44 is releasably held in place within the opening 48 and against movement toward the plate 22 in the manner most clearly illustrated by Figs. 3 and 4 of the drawing. The outermost face of the substantially cylindrical tube 44 is beveled as at 58 with the greatest diameter of the tube 44 adjacent the external annular flange 52. Additionally, the collet section 44 is provided with a number of longitudinal slots 60 extending from that end thereof proximal to the collet section 46 and terminating in an enlarged opening 62 at the closed end thereof to assure a high degree of flexibility of the fingers 64 presented by slots 60. The collet section 46 is adapted to receive the section 44 in the manner shown by Figs. 3 and 4 of the drawing and accordingly is provided with an enlarged, frusto-conical bore portion 66 having much the same configuration as the beveled portion 58 of tube 44 and of a size such as to cause contraction of the fingers 64 as shown in Fig. 4 when the plates 20 and 22 are moved together.

When the machine is adapted for use in injection molding, the supporting plates or platens 12 and 20 are adapted to receive articles 68 and 70 in the nature of mold elements, one of which may in some cases be termed the female mold element and the other, a complementary male element. Also, it is well understood that when the elements 68 and 70 are brought together and suitable material forced therebetween, an article of manufacture will be formed following the configuration of the proximal mating faces of the elements 68 and 70.

Accordingly, in use of the apparatus above described, the hydraulic assembly including cylinder 24 and piston stem 26, is placed in operation to cause the stem 26 to move toward the plate 12 and thereby shift both plates 20 and 22 and their accompanying parts toward the plate 12. The four rods 16 serve as guides for the plates 20 and 22 because of the fact that the four collet assemblies 42 are normally free to slide thereon. During such movement of the plates 20 and 22 toward the plate 12, the springs 40, because of their inherent strength and resiliency, are capable of maintaining the plates 20 and 22 apart and therefore, holding the collet assemblies 42 in an inoperable condition. However, as soon as the elements 68 and 70 move together, the extent of additional movement of plate 20 toward the plate 12 is determined and continued pressure upon the plate 22 by the piston stem 26 and against the action of springs 40, causes the plate 22 to move relative to the plate 20 and toward plate 20. This action moves the four collet sections 46 into engagement with the corresponding sections 44 and by virtue of the complementary configurations 58 and 66, the fingers 64 will be squeezed together or contracted into gripping relationship with the corresponding rods 16.

It is obvious that as the pressure is maintained and continued, the extent of gripping of the rods 16 by the collet portions 44, will become progressively greater and movement of the plates 12 and 20 and accordingly, their elements 68 and 70 away from each other, will be prevented.

While no sprue opening has been shown for reception of material within the cavity or cavities between the dies or mold sections 68 and 70, it is to be understood that such operation, being well known in the art, need not be fully described. Fluids of varying degrees of viscosity may be injected with force, since no flash between the die parts 68 and 70 will occur as a result of yielding of the platen 20 while pressure is maintained on stem 26 and while the collets 42 are in a locked condition. Also, problems relating to heating or cooling to effect hardening of the material between the dies are in no way enhanced by use of the machine hereof.

After the elements 68 and 70 have been held in an operative position, a sufficient length of time for setting of material that is injected therebetween, release of the compression within the cylinder 24 will immediately cause the plates 20 and 22 to separate by virtue of the force of springs 40. The first action therefore, in the separation of the plates 20 and 22 is to cause the collet sections 44 to release their grips upon rods 16. Thereupon, continued movement of the stem 26 to the retracted position shown in full lines in Fig. 1 will pull the plates 20 and 22 toward the plate 14. By virtue of the heads formed on the bolts 34 as illustrated in Fig. 1 of the drawing, the pulling action of stem 26 on head 32 will accordingly impart pulling action to the plate 20 and thus to the plate 22 through springs 40.

Figure 1 of the drawing also illustrates in dotted lines, the action of the plates 20 and 22 as they move together, and when the springs 40 are compressed, bolts 34 will extend a distance away from that face of head 32 proximal to stem 26, all because of the loose fit of bolts 34 in openings 36 and 38.

The advantages resulting from the structure above described will now become apparent to those skilled in the art and particularly it will become clear that there is provided structure for more effectively locking the mold or die members against separation, which structure is capable of withstanding a high degree of abuse, and such wear as may take place will have little effect upon holding of the die members in the proper operative position.

Prior attempts to hold die members together under compression alone have been useful only where extreme pressures are not needed, but even when used, the tendency toward leakage causes objectionable flashing between the dies that cannot be rectified once it starts. And, the principles hereof are in no way equivalent to constructions wherein toggle joints, above referred to, are operated hydraulically, for in the present invention it is the combined action of the fluid pressure and the collet locks that produces the advantages herein enumerated.

While the principles of the present invention have been described in connection with injection molding machines, it is clear, as above mentioned, that the collet construction, together with the guiding rods and supporting plates may well be used in other fields.

Having thus described my invention, what I claim as new and desire to secure by Letters Patent is:

1. A device for holding a pair of articles in clamped interengagement, said device comprising a first rigid plate for supporting one of said articles; a second plate for supporting the other of said articles and reciprocable toward and away from said first plate; means for guiding the second plate along its reciprocable path of travel; reciprocable actuating means for said second plate and mounted for movement relative to the second plate toward and away therefrom; and chuck structure having parts on the second plate and parts on said actuating means for gripping the guide means on movement of the actuating means toward the second plate during interengagement of said articles.

2. A clamping device comprising a pair of spaced members; guide means joining the members; a pair of non-rotatable plates reciprocably mounted on the guide means and interconnected for movement toward and away from each other; and chuck means having parts on each plate respectively for gripping the guide means upon movement of the plates toward each other.

3. A clamping device comprising a pair of spaced members; guide rods joining the members; a pair of non-rotatable plates reciprocably mounted on the guide rods and interconnected for movement toward and away from each other; and a chuck for each rod respectively, each chuck having parts on each plate respectively for gripping the guide rods upon movement of the plates toward each other, said parts including a tube on each plate respectively circumscribing the corresponding rod, one of the tubes being adapted to be received by the other tube for contraction thereby as the plates move together.

4. In a molding machine, a pair of spaced, rigid members; guide means joining the members; a pair of non-rotatable plates reciprocably mounted on the guide means and interconnected for movement toward and away from each other; one of the members and the plate proximal thereto being adapted to mount a mold element; structure connected with the other plate for moving the plates to and from a position forcing and holding the mold elements together under pressure; and chuck means having parts on each plate respectively for gripping the guide means upon movement of the plates toward each other by said structure while the mold elements are together.

5. A device for holding a pair of articles in clamped interengagement, said device comprising a support for each article respectively, one of said supports being shiftable toward and away from the other support; guide means for said one support; reciprocable actuating means connected with said one support for shifting the latter and for reciprocation relative thereto; and structure having parts on said one support and on said actuating means for gripping the guide means on reciprocation of said actuating means relative to said one support after shifting of the latter to a position clamping the articles together.

6. A device for holding a pair of articles in clamped interengagement, said device comprising a support for each article respectively, one of said supports being shiftable toward and away from the other support; guide means for said one support; reciprocable actuating means connected with said one support for shifting the latter and for reciprocation relative thereto; and structure having parts on said one support and on said actuating means for gripping the guide means on reciprocation of said actuating means relative to said one support after shifting of the latter to a position clamping the articles together, said structure being movable to and from a position gripping the guide means as said actuating means is moved toward and away from said one support.

7. A device for holding a pair of articles in clamped interengagement, said device comprising a support for each article respectively, one of said supports being shiftable toward and away from the other support; guide means for said one support; reciprocable actuating means connected with said one support for shifting the latter and for reciprocation relative thereto; structure having parts on said one support and on said actuating means for gripping the guide means on reciprocation of said actuating means relative to said one support after shifting of the latter to a position clamping the articles together, said structure being movable to and from a position gripping the guide means as said actuating means is moved toward and away from said one support; and yieldable apparatus between the one support and said actuating means for holding the same biased apart.

References Cited in the file of this patent

UNITED STATES PATENTS

| Number | Name | Date |
| --- | --- | --- |
| 303,251 | Almond | Aug. 12, 1884 |
| 827,346 | Bubb | July 31, 1906 |
| 1,356,458 | Moody | Oct. 19, 1920 |
| 1,805,095 | Horni | May 12, 1931 |
| 1,910,121 | Muntz | May 23, 1933 |
| 2,416,348 | Renier | Feb. 25, 1947 |